Nov. 6, 1951        R. D. HALL        2,573,708
PARKER HOUSE ROLL MACHINE
Filed July 27, 1948        4 Sheets-Sheet 1
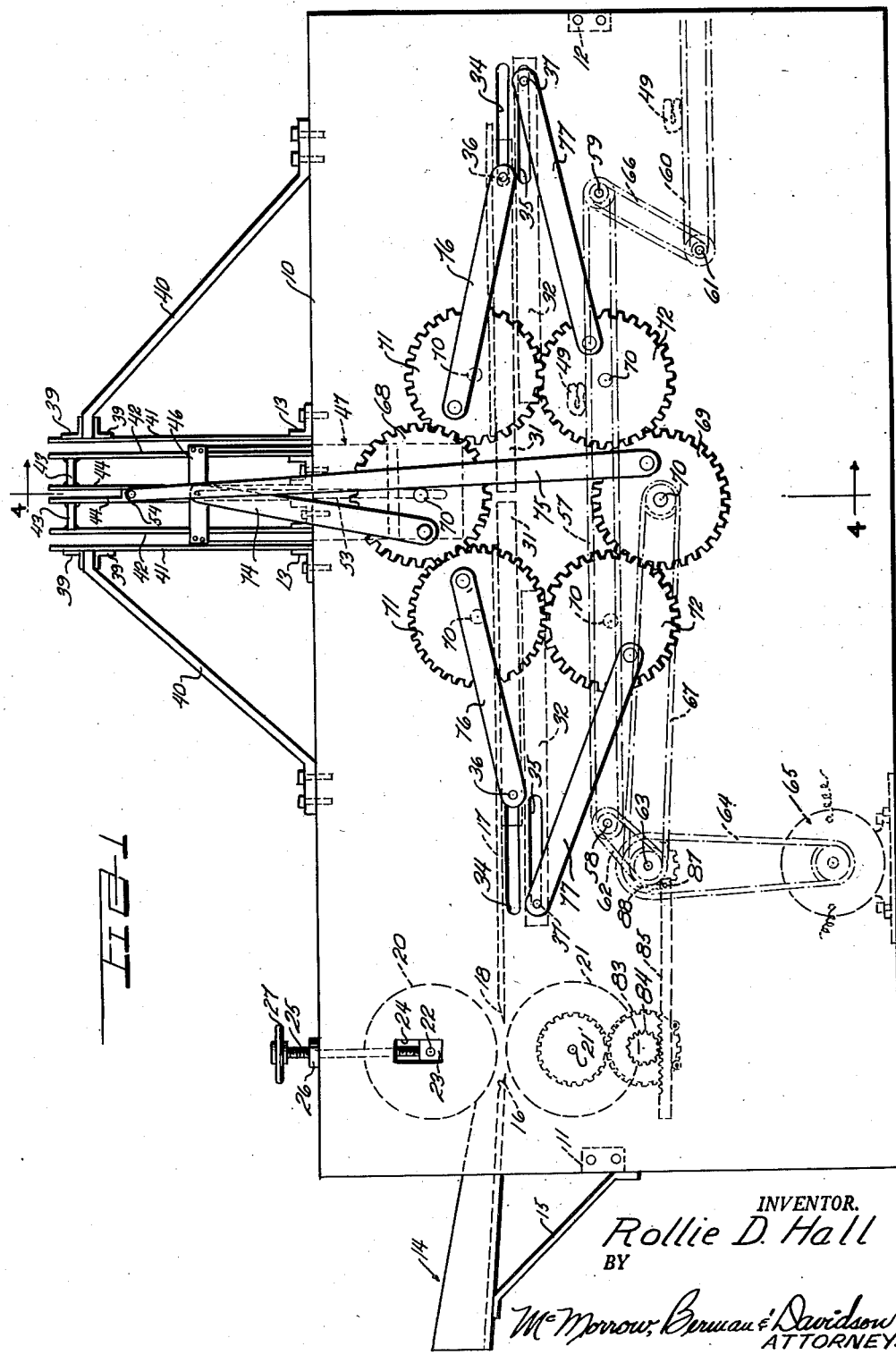
INVENTOR.
Rollie D. Hall
BY
McMorrow, Berman & Davidson
ATTORNEYS

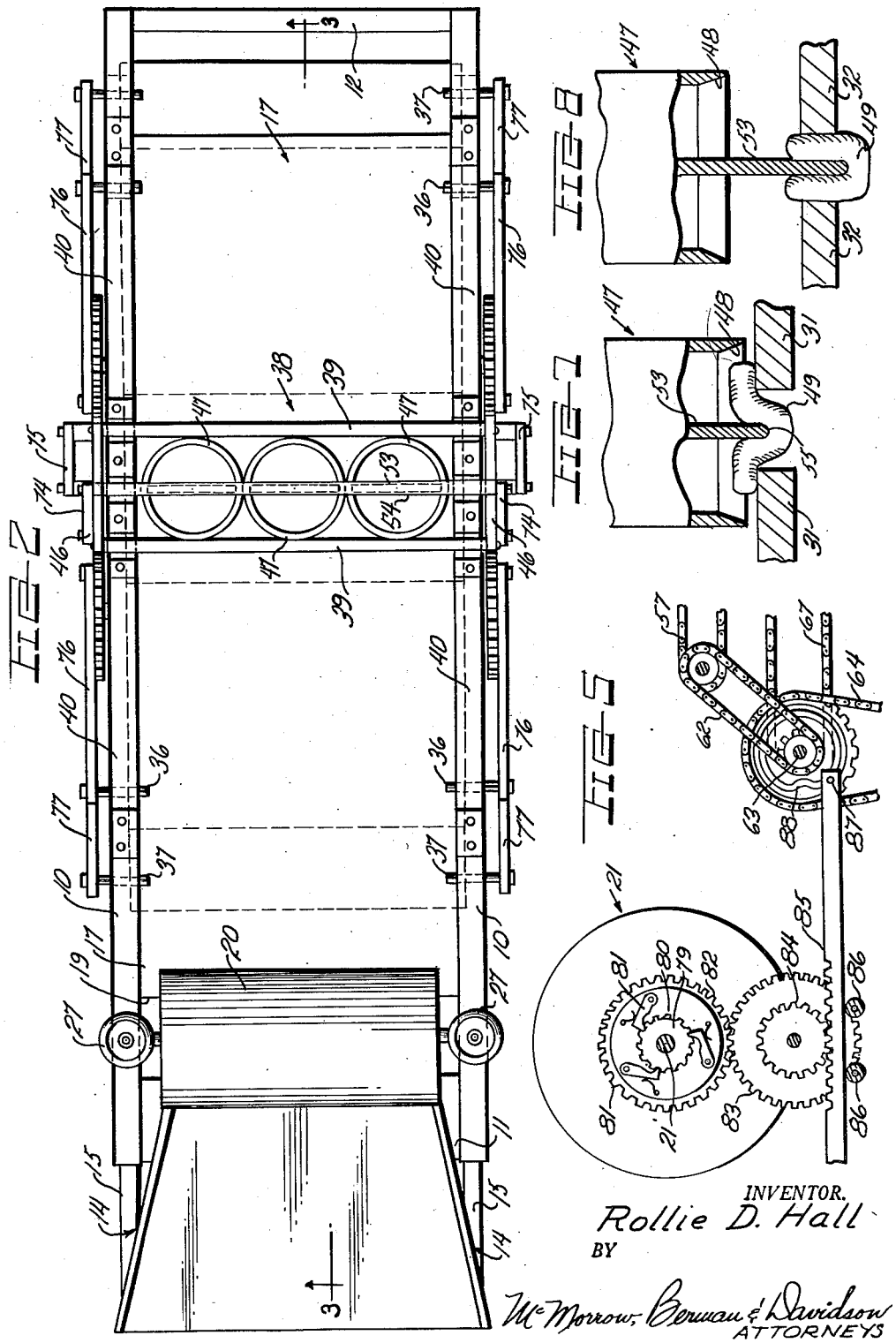

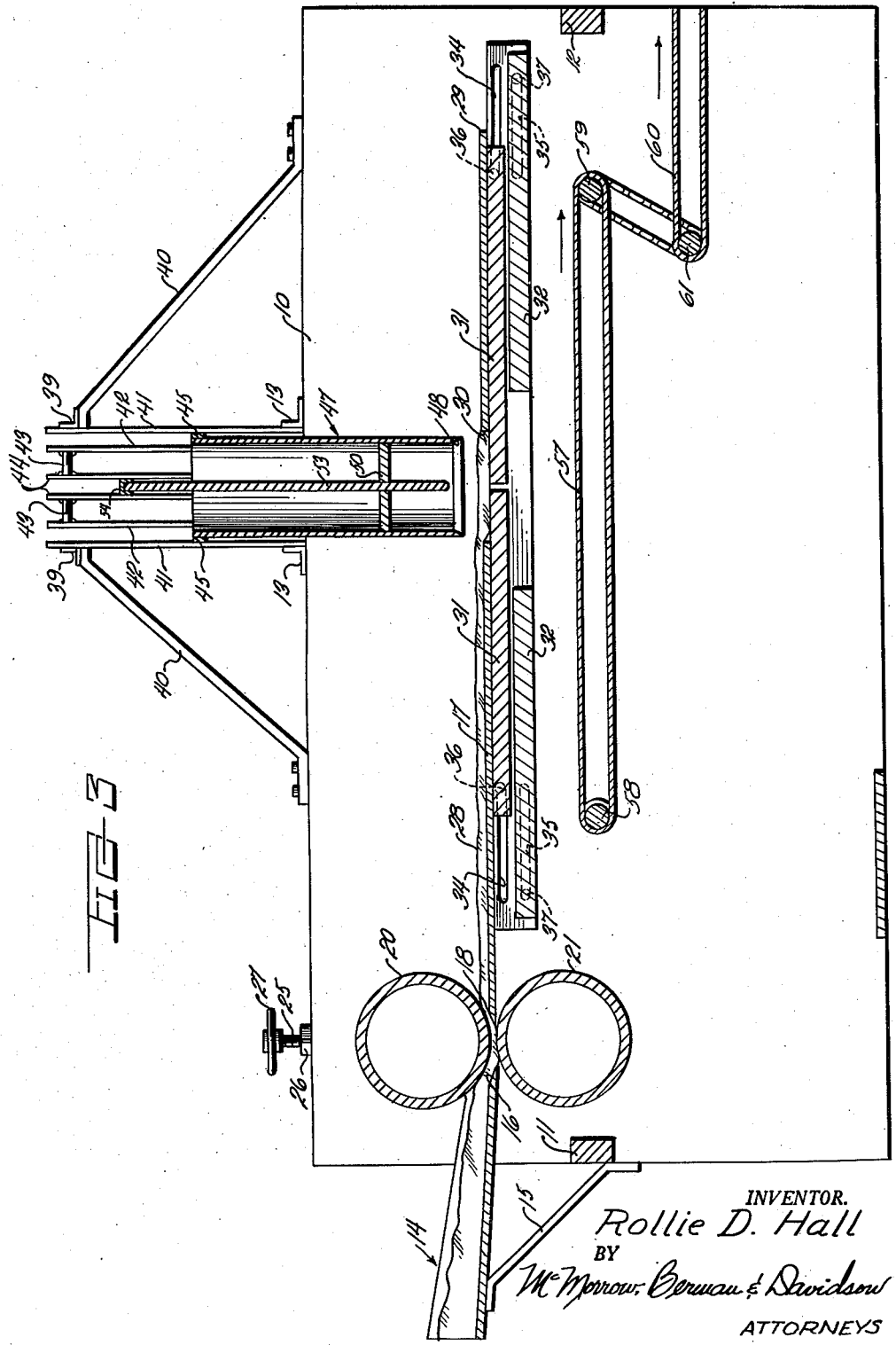

Nov. 6, 1951 R. D. HALL 2,573,708
PARKER HOUSE ROLL MACHINE
Filed July 27, 1948 4 Sheets-Sheet 4
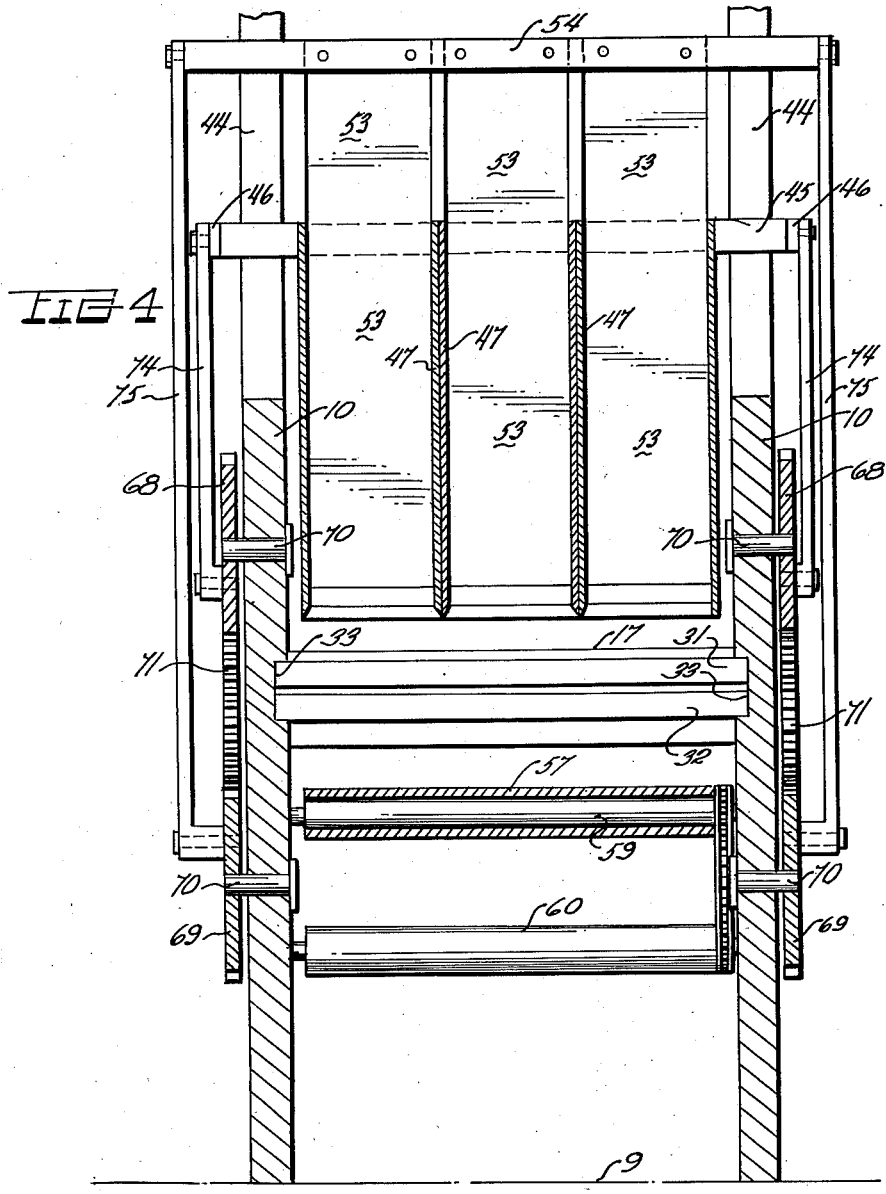
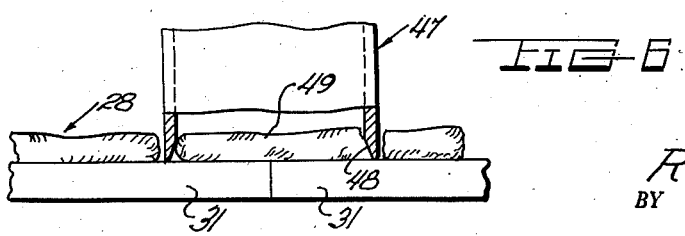
INVENTOR.
Rollie D. Hall
BY
McMorrow, Berman & Davidson
ATTORNEYS Patented Nov. 6, 1951

2,573,708

UNITED STATES PATENT OFFICE 2,573,708

PARKER HOUSE ROLL MACHINE

Rollie D. Hall, Houston, Tex.

Application July 27, 1948, Serial No. 40,943

4 Claims. (Cl. 107—9)

This invention relates generally to apparatus for forming and feeding dough pieces, and more particularly to a machine for forming and folding Parker House roll dough pieces and feeding them to a baking apparatus ready for baking. The primary object of the invention being to provide a machine of this character which will produce Parker House dough pieces ready for panning without requiring semi-proofing.

Another important object of the invention is the provision of a machine of the above indicated character which produces the dough rolls in more uniform and more accurately formed condition in less time than that required in processes which include semi-proofing of the dough.

Another important object of the invention is the provision of a machine of the above indicated character in which dough feeding means, dough cutting means, first and second stage folding means, and discharging means are coordinated and timed in operative relation to each other, and can all be driven from the same motor or other power source.

Other important objects and advantageous features of the invention will be apparent from the following description and accompanying drawings, wherein for the purposes of illustration only, a specific embodiment of the invention is set forth in detail.

In the drawings:

Figure 1 is a right hand side elevation, with concealed parts shown in dotted lines.

Figure 2 is a top plan view.

Figure 3 is a vertical longitudinal section taken on the line 3—3 of Figure 2.

Figure 4 is a transverse vertical section taken on the line 4—4 of Figure 1.

Figure 5 is an enlarged fragmentary detail of the dough feeding mechanism, partly in side elevation and partly in vertical longitudinal section.

Figure 6 is an enlarged fragmentary side elevation, partly in section, of one of the blank cutting dies, showing the same in operative relation to the upper slides.

Figure 7 is a view similar to Figure 6 showing the die plunger giving the cut blank its first folding between the upper slides.

Figure 8 is a view similar to Figure 7 showing completion of the folding.

Referring in detail to the drawings, the illustrated machine comprises a frame resting upon a floor 9 or other supporting surface, consisting of laterally spaced similar longitudinally elongated side walls 10, 10, connected at their rearward and forward ends by cross members 11 and 12, respectively, and at a point near their forward ends by transverse laterally spaced angle irons 13, 13 secured to the upper edges of the side walls.

A forwardly tapering and declining dough chute 14 is supported on an upper level between the rear ends of the side walls 10, 10 by diagonal braces 15, 15 and terminates in a downwardly bevelled forward end 16, in the same plane with a stationary horizontal table 17 supported between the side walls, whose rear downwardly bevelled end 18 is spaced forwardly from the downwardly bevelled end 16 so as to define a transversely elongated opening 19 through which the upper and lower dough thinning rollers 20, 21, respectively, operate.

The upper dough thinning roller 20 has a shaft 22 journalled at its opposite ends in block bearings 23, 23 vertically adjustable in vertically elongated slots 24, 24 formed in the opposite side walls 10, 10. Vertical screws 25, 25 working through nuts 26, 26 supported on the upper edges of the side walls are connected to the block bearings 23, 23 and have hand wheels 27, 27 on their upper ends arranged to be turned by hand to adjust the spacing of the upper roller 20 from the lower roller 21, and thereby the thickness of the dough sheet 28 run forwardly onto the table 17. The table 17 extends to a point 29 near the forward end of the machine but has a transversely elongated opening 30 intermediate its ends.

Upper and lower pairs of similar slides 31, 31 and 32, 32 have their side edges confined in horizontal grooves 33, 33 formed in the inner sides of the side walls, said grooves extending similar distances forwardly and rearwardly from the table opening 30. Near the rearward and forward ends of the grooves are longitudinally elongated guide and bearing slots 34, 34 and 35, 35, respectively, formed through the side walls 10, 10, in which are slidably confined for movement therealong in opposite directions the upper slide supporting pins and the lower slide supporting pins 36, 36 and 37, 37, respectively. The pins project laterally outwardly through the slots and beyond the related side walls 10, 10, and the lower slides are closely spaced below the upper slides, as shown in Figure 3.

Supported by the angle irons 13, 13 on the upper edges of the side walls 10, 10 in vertical alignment with the table opening 30 is the dough cutting assembly 38, comprising a frame including upper pairs of transverse angle irons 39, 39 to which the upper ends of diagonal braces 40, 40 are secured having their lower ends secured to the upper edges of the related side walls 10, 10. The angle irons are secured to forward and rearward transverse guide plates 41, 41 which have spaced from the inward sides additional guide plates 42, 42. Rods 43, 43 connect the plates 42, 42 with a centrally positioned pair of guide plates 44, 44.

Working between the paired guide plates 41 and 42 are transverse bars 45, 45 which have cross bars 46, 46 connected to their outer ends. Secured to and between the bars 45, 45 is a plurality of laterally adjacent dough cutting dies 47, here shown as cylindrical and which, as shown in Figure 6, have internally bevelled cutting edges 48 at their lower ends, which are adapted to cut through the portion of the dough sheet 28 lying upon the substantially meeting upper slides 31, 31 in the table opening 30, so as to cut a similar plurality of circular dough blanks 49, as indicated in Figures 3 and 6. Any other desired shape of cutting dies may be used.

The die cylinders 47 have horizontal partitions 50 near their lower ends formed with diametrical guide slots 51, aligned with vertical slots 52, 52 formed in opposite side walls of the cylinders, in which slots plate-like dough blank folding elements 53 are vertically reciprocable. The upper ends of the folding elements 53 are connected at their upper ends to a transverse bar 54 which slides between the guide plates 44, 44. As indicated in Figure 6, the rounded lower edge or end 55 of the folding element 53 is arranged to be spaced above the lower end of its cutting cylinder 47 in the extreme depressed cutting position of the cylinder. After the dough blank 49 has been cut out and the cylinder 47 starts to rise, the lower edge 55 of the folding element descends to a level below the lower end of the cylinder 47 as the adjacent edges of the upper slides 31, 31 move away from each other, so that the dough blank 49 is given its initial downward fold, as shown in Figure 7. As the folder 53 continues descending from the position shown in Figure 7, the initially folded dough blank 49 is pushed downwardly through the aperture between the upper slides 31, 31 with the lower slides 32, 32 separated and into position in the aperture provided by the separated lower slides 32, 32 whereupon the lower slides are moved toward each other so as to give the initially folded dough piece 49 a second folding into a U-shape, as shown in Figure 8, resulting in its assuming final Parker House form. The lower slides then separate whereby the twice folded dough piece falls onto a conveyor arrangement hereinafter described.

The die cylinders 47 above the partitions 50 act as containers for butter for application to the dough blank 49 by the folder 53 during the above described operations.

Parallelly spaced below the lower slides 32, 32 to receive the formed dough blanks 49 therefrom is the upper endless conveyor belt 57 trained at opposite ends over roller shafts 58 and 59, respectively, journalled through the machine frame sidewalls 10, 10, the upper flight of the belt being arranged to move forwardly, as indicated by the arrow in Figure 3 so as to deposit the formed dough blanks thereon onto a lower discharge endless belt 60 trained over roller shafts 61, 61 journalled through the side walls 10, 10.

The conveyor roller shaft 58 is connected by a sprocket chain 62 with a driven shaft 63 journalled, as shown in Figure 1, in a side wall 10 below the level of the lower conveyor belt 60 and near the rear end of the side wall 10, the shaft 63 being connected by a sprocket chain 64 with an electric motor 65 or other suitable power source. The forward conveyor roller shaft 59 is connected by a sprocket chain 66 with the rear roller shaft 61 of the lower conveyor belt 60.

The driven shaft 63 is further connected by a sprocket chain 67 with the lower of two vertically aligned gears 68 and 69 having stubshafts 70 journalled in the opposite sidewalls 10, 10 as shown in Figure 4. The gears 68 and 69 are of the same size and the upper gear is located between and in mesh with an upper pair of similar gears 71, 71, similarly mounted on opposite sidewalls 10, 10. The lower gear 69 is similarly positioned between and in mesh with a lower pair of similar gears 72, 72. As a result all of the gears turn together at the same speed.

For operating the dough blank folders 53, pitmans 75, 75 are pivoted at opposite ends to the ends of the cross bar 54 and eccentric points on the gears 69, 69, at opposite sides of the cutting assembly 38. Similarly, pitmans 74, 74 connect the cross bars 46 of the cutters 47, with eccentric points on the upper gears 68, 68, whereby the folders and cutters are coordinately vertically reciprocated.

Upper pitmans 76, 76 connect with pin 36, 36 of the upper slides 31, 31 with eccentric points on the adjacent gears 71, 71 while lower pitmans 77, 77 connect with pins 37, 37 of the lower slides 32, 32 with the lower pair of gears 72, 72.

Intermittent forward feeding of the dough sheet 28 is produced by the ratchet drive, shown in Figure 5, for the lower dough thinning roller 21. This drive comprises the lower roller shaft 21' on which is fixed thereon a rachet wheel 79, with the straight sides of the teeth 80 faced clockwise and cooperating with spring pressed ratchet pawls 81 pivoted in the interior of the roller 21 and projecting in the counterclockwise direction. A ring gear 82 on the roller 21 is connected with a dual gear therebelow, supported on the adjacent frame side wall 10 and involving a large gear wheel 83 in mesh with the ring gear 82 and a smaller gear wheel 84 in mesh with a horizontal rack bar 85 supported on rollers 86, 86 on said side wall for endwise movement.

The forward end of the rack bar 85 has a cam follower 87 engaged with a scroll cam 88 on the already mentioned driven shaft 63, the cam being contoured to cause the lower roller 21 to turn clockwise and advance the dough sheet 28 one step each time the cutting assembly 38 completes an operation.

The above described operative connections of the functioning components of the machine coordinate and time their operations, so that as the dough from the chute 14 is drawn between the thinning rollers 20, 21, the resultant dough sheet 28 is fed forwardly intermittently the required distance, so that the dough sheet is advanced into position and stopped when the cutters or dies 47 are in their elevated positions. The dies then immediately move downwardly until they cut a plurality of blanks 49 by cutting through the dough, then lying on the abutting upper slides 31, 31. As the upper slides 31, 31 start to separate, the folders 53 move downwardly and engage the blanks 49 so as to impart the initial fold or crease thereto, at the same time applying thereto liquid butter from the cylinders 47. The folders continue downwardly past the upper slides, still in contact with the blanks 49, so as to put the blanks on the level of the then separated lower slides 32, 32, whereat the lower slides 32, 32 move toward each other and engage opposite sides of the creased blanks. At this point the folders 53 retreat upwardly and the lower slides continue their movement toward each other, with the result that the blanks 49 have their folded sides pressed tightly together. The lower slides then separate and release the blanks to fall upon the upper conveyor belt 57 in the form of a completed Parker House roll, ready for discharge by the lower belt 60 to be baked.

I claim:

1. A machine for forming rolls comprising a frame having transversely spaced longitudinal sidewalls, a substantially horizontal stationary table mounted between said sidewalls, said table being formed intermediate its ends with a transverse opening, means for intermittently feeding a sheet of dough along said table from one end thereof toward and across said opening, upper and lower pairs of coplanar slides mounted on and between said sidewalls below and in registration with said table opening, means for moving the slides of each pair toward and away from each other, said upper pair of slides when moved toward each other with their adjacent edges in substantial abutting relation providing a supporting surface registered with said table opening for supporting a leading portion of said dough sheet in said table opening, a cutting and forming assembly mounted on and between said sidewalls above said table and registered with said opening, comprising at least one vertically reciprocable hollow die member having a cutting edge on its lower end for cutting a dough blank from a leading portion of the dough sheet on said supporting surface when said die member is depressed from an elevated position, and a vertically reciprocable dough blank folder plate supported within and positioned across said hollow die member, said folder plate being operable from an elevated position to a depressed position below said cutting edge of said die member to engage a dough blank crosswise, and coordinating means operatively connecting said intermittent dough sheet feeding means, said upper and lower pairs of slides, said die member, and said dough folder whereby cutting out of a dough blank is followed by partial elevation of said die member from the dough sheet on the meeting upper pair of slides accompanied by descent of said dough folder plate and separation of said pair of upper slides whereby said dough folder plate depresses said dough blank between said adjacent edges of said upper slides in a manner to crease said dough blank downwardly with opposite sides of said dough blank projecting upwardly, then depresses the creased dough blank further downwardly beneath the level of said lower pair of slides, accompanied by movement of the lower slides toward each other from separated position in a manner to engage the approaching edges of said lower slides with said upwardly projecting opposite sides of the dough blank, followed by upward withdrawal of said dough folder plate from between the said sides of the blank and further approach of said lower slides toward each other sufficient to compress the said sides of the dough blank together, followed by separation of said lower slides permitting the resultant dough form to fall from between said lower slides.

2. A machine for forming rolls comprising a frame having transversely spaced longitudinal sidewalls, a substantially horizontal stationary table mounted between said sidewalls, said table being formed intermediate its ends with a transverse opening, means for intermittently feeding a sheet of dough along said table from one end thereof toward and across said opening, upper and lower pairs of coplanar slides mounted on and between said sidewalls below and in registration with said table opening, means for moving the slides of each pair toward and away from each other, said upper pair of slides when moved toward each other with their adjacent edges in substantial abutting relation providing a supporting surface registered with said table opening for supporting a leading portion of said dough sheet in said table opening, a cutting and forming assembly mounted on and between said sidewalls above said table and registered with said opening, comprising at least one vertically reciprocable die member having a circular cutting edge on its lower end for cutting a circular dough blank from a leading portion of the dough sheet on said supporting surface when said die member is depressed from an elevated position, a vertically reciprocable dough blank folder plate supported within and positioned across said die member, said folder plate being operable from an elevated position to a depressed position below said cutting edge of said die member to engage a dough blank substantially diametrically, and coordinating means operatively connecting said intermittent dough sheet feeding means, said upper and lower pairs of slides, said die member and said dough folder whereby cutting out of a dough blank is followed by partial elevation of said die member from the dough sheet on the meeting upper pair of slides accompanied by descent of said dough folder and separation of said pair of upper slides whereby said dough folder depresses said dough blank between said adjacent edges of said upper slides in a manner to crease said dough blank downwardly along a diameter thereof with opposite sides of said dough blank projecting upwardly, then depresses the creased dough blank further downwardly beneath the level of said lower pair of slides, accompanied by movement of the lower slides toward each other from separated position in a manner to engage the approaching edges of said lower slides with said upwardly projecting opposite sides of the dough blank, followed by upward withdrawal of said dough folder from between the said sides of the blank and further approach of said lower slides toward each other sufficient to compress the said sides of the dough blank together, followed by separation of said lower slides permitting the resultant dough form to fall from between said lower slides, said die member comprising a portion containing liquid butter or the like in contact with said vertically reciprocable dough folder plate whereby said dough folder plate applies liquid butter or the like to the dough blanks while in contact therewith.

3. A machine for forming rolls comprising a frame having transversely spaced longitudinal sidewalls, a substantially horizontal stationary table mounted between said sidewalls, said table being formed intermediate its ends with a transverse opening, means for intermittently feeding a sheet of dough along said table from one end thereof toward and across said opening, upper and lower pairs of coplanar slides mounted on and between said sidewalls below and in registration with said table opening, means for moving the slides of each pair toward and away from each other, said upper pair of slides when moved toward each other with their adjacent edges in substantial abutting relation providing a supporting surface registered with said table opening for supporting a leading portion of said dough sheet in said table opening, a cutting and forming assembly mounted on and between said sidewalls above said table opening, comprising at least one vertically reciprocable die member having a circular cutting edge on its lower end for cutting a circular dough blank from a leading portion of the dough sheet on said supporting surface when said die member is depressed from an elevated position, a vertically reciprocable dough blank folder operable from an elevated position to a depressed position below said cutting edge to engage a dough blank substantially diametrically, and coordinating means operatively connecting said intermittent dough sheet feeding means, said upper and lower pairs of slides, said die member and said dough folder whereby cutting out of a dough blank is followed by partial elevation of said die member from the dough sheet on the meeting upper pair of slides accompanied by descent of said dough folder and separation of said pair of upper slides whereby said dough folder depresses said dough blank between said adjacent edges of said upper slides in a manner to crease said dough blank downwardly along a diameter thereof with opposite sides of said dough blank projecting upwardly, then depresses the creased dough blank further downwardly beneath the level of said lower pair of slides, accompanied by movement of the lower slides toward each other from separated position in a manner to engage the approaching edges of said lower slides with said upwardly projecting opposite sides of the dough blank, followed by upward withdrawal of said dough folder from between the said sides of the blank and further appoach of said lower slides toward each other sufficient to compress the said sides of the dough blank together, followed by separation of said lower slides permitting the resultant dough form to fall from between said lower slides, said die member being cylindrical in form and said dough folder comprising a vertically elongated plate slidably mounted in a diametrical position in said cylinder for vertical reciprocation relative to said cylinder.

4. In a roll forming machine, a support including a horizontal table along which a dough sheet is adapted to be moved forwardly, means at the rearward end of said table for intermittently feeding the dough sheet forwardly upon said table, said table being formed intermediate its ends with an opening, means movable for covering and uncovering said opening and when covering said opening providing a supporting surface for a leading portion of said dough sheet, a cutting and forming assembly mounted on said support over said table opening, said assembly comprising a hollow die arranged to descend for cutting a dough blank from said leading portion while said means is covering said table opening and a vertically reciprocable plate mounted within and extending across said hollow die, said plate being arranged to descend below said die to crease the dough blank crosswise, said means further comprising means for engaging opposite sides of said dough blank and compressing such sides against each other along the crease.

ROLLIE D. HALL.

REFERENCES CITED

The following references are of record in the file of this patent:

UNITED STATES PATENTS

| Number | Name | Date |
|---|---|---|
| 1,747,954 | Rydberg | Feb. 18, 1930 |
| 1,834,012 | Willoughby | Dec. 1, 1931 |
| 2,137,811 | Royal | Nov. 22, 1938 |
| 2,261,043 | Winfree, Jr. | Oct. 28, 1941 |
| 2,283,298 | Thum | May 19, 1942 |
| 2,446,201 | Turner | Aug. 3, 1948 |